United States Patent Office 3,548,645
Patented Dec. 22, 1970

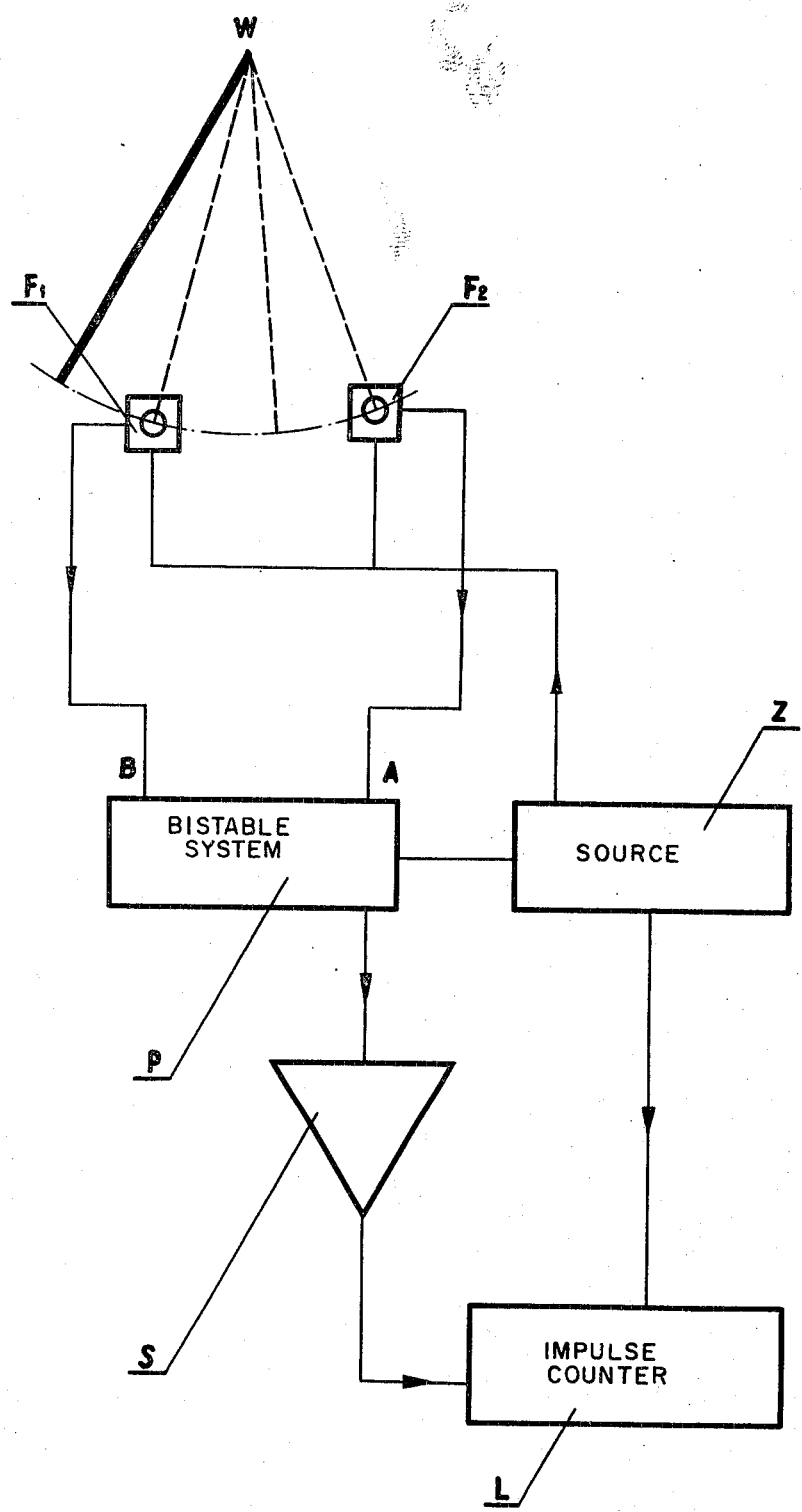

3,548,645
DEVICE FOR MEASURING HARDNESS OF
PLASTICS BY MEANS OF PENDULUM
METHOD
Ryszard Tadeusz Sikorski, Ul. Otwarta 2/10, and Janusz
Nowaczyk, Ul. Szenwalda 5/2, both of Wroclaw,
Poland
Filed Jan. 24, 1968, Ser. No. 701,530
Int. Cl. G01d 5/36; G01n 3/52
U.S. Cl. 73—79                                  1 Claim

ABSTRACT OF THE DISCLOSURE

Apparatus for measuring the hardness of plastic by counting the number of swings of a pendulum whose movement is damped by the test material comprising a pair of photoelectric sensors connected to a bistable system for providing an output at each full cycle of the pendulum past both sensors, and means for counting the outputs of said bistable system.

---

The invention concerns a device for the determination of hardness of plastics, especially of points by means of pendulum method.

There are known simple devices for the determination of the hardness of plastics by the pendulum method. By means of these devices the hardness is determined through measurement of time of damping of the movement of a pendulum supported on the surface tested. A disadvantage of devices of this type is the large measuring error due to the necessity of continuously watching the movement of the pendulum during the time of measurement and a subjective error made when the end point of the measurement is estimated. This error is due to the small average damping (ca 0.06 mm./cycle).

The object of this invention is to avoid these disadvantages i.e. to eliminate the subjective error though limiting of the role of experimenter only to initiation of the measurement and to the reading of results.

The essence of this invention consists in the combination of an electronic device composed of photoelectric sensing elements connected through a bistable system and a separating amplifier with an impulse counter. This system is coupled with the pendulum apparatus in which the pendulum functions as a diaphragm for the photoelectric sensing elements. This device automatically records the number of pendulum cycles in the interval of the time from start to the moment when the oscillations of pendulum become damped to existing norms.

In the single figure there is shown a schematic view of the device according to the invention.

The invention for determination of hardness consists of a conventional pendulum apparatus for the measurement of hardness and for an electronic system for automatically making the measurement. The electronic system, shown in the drawing, is composed of two photoelectric sensing elements $F_1$ and $F_2$, bistable system P, separating amplifier $s$, impulse counter L and source $z$. Upon introduction of a non-transparent diaphragm between a light source (not shown) and the photoelectric sensing elements $E_1$ and $E_2$, they produce output impulses. In the present invention the pendulum functions as a diaphragm. The principle of this arrangement is as follows: before the measurement is started the counter L is set to zero. During the measurement the pendulum W effects as it oscillates a screening of or blocking of light from photoelectric sensing elements $F_1$ and $F_2$ which produces electric impulses at their outputs. The bistable system P is controlled asymmetrically by sensing elements $F_1$ and $F_2$ in such a way that the impulse produced at the input A transforms the bistable system P from state zero to state one and the impulse produced at the input B transforms the system P from state one to state zero. One cycle of the pendulum is recorded by the impulse counter L only when the bistable system is in state zero and receives an impulse from the sensing element $F_2$. The role of sensing element $F_1$ is to make the bistable system P ready for the production of an output impulse which is to be counted. Due to the "memory" constituted by the bistable system P one cycle of the pendulum is counted only once although the sensing element $F_2$ is screened or blocked two times by the pendulum swinging back and forth. The sensing elements $F_1$ and $F_2$ are placed in the apparatus in such a way that when the pendulum is released from its starting point it screens first the sensing element $F_1$ and then the element $F_2$. Due to such arrangement it is unnecessary to bring the bistable system P to state zero before measurement, because if it is in state one it will be brought to state zero by the output impulse produced by sensing element $F_1$ at the initial phase of the movement of the pendulum. The impulses are fed into the impulse counter L as long as the pendulum screens the sensing element $F_2$ during its movement, that is until the amplitude of the pendudum W is damped to the standard value of 2°. The number obtained as a result of the measurement and recorded by the counter L represents the numberof of pendulum cycles made during the test. This number is proportional to the hardness of the material tested. The quotient of counter readings obtained with the plastic tested and with standard glass plate represents a measure of the relative hardness of the investigated material. The course of measurement is as follows: the electronic device is connected with a source of alternating current of 220 v., 50 Hz. A sample of the tested material in the form of a plate having the dimensions of about 60 x 10 x 3 mm. is placed on the measuring table and the pendulum is supported on this plate. The pendulum is moved from vertical position to the standard angular value of 5°, the impulse counter is set to zero and the pendulum is released. From this moment the measurement is automatic. When the counting by the impulse counter L is over the recorded number is read. This number, divided by the number obtained with a standard glass plate represents the value of the relative hardness of tested plastic. The device is standardized by adjustment of the position of the pendulum weights, when the pendulum is supported on standard glass plate, until the value of $340 \pm 4$ cycles is obtained.

The substantial technical advantage of the determination of hardness according to this invention is the elimination of possibilities of errors made by the experimenter, elimination of subjective errors involved with the estimation of pendulum damping and total automation of measurement. Further advantages are as follows: the results are expressed directly in numerical form, may be registered and, eventually, transmitted at distance.

What is claimed is:

1. Apparatus for measuring in which a pendulum is damped comprising in combination; a light source, opaque pendulum means positioned to interrupt light therefrom, optical means comprising a pair of spaced photoelectric sensing means positioned one on each side of the rest position of the pendulum to sense the motion of said pendulum means during swinging movement thereof, and means for counting the number of times both sensing means sense the motion of said pendulum comprising bistable means for receiving signals from said sensing means and for generating an output signal in response to input signals alternately received from said sensing means, and means for counting said output signals of the said bistable means.

References Cited

UNITED STATES PATENTS

| | | | |
|---|---|---|---|
| 1,565,596 | 12/1925 | Snook | 73—382 |
| 2,077,390 | 4/1937 | Blau | 73—382 |
| 2,266,862 | 12/1941 | Hardey | 235—92 |
| 2,296,657 | 9/1942 | Wallace | 73—9 |
| 2,318,993 | 5/1943 | Hathaway | 73—79 |
| 3,105,381 | 10/1963 | Collette | 73—71.3X |
| 3,191,044 | 6/1965 | Wilmotte | 235—92 |

FOREIGN PATENTS

| | | | |
|---|---|---|---|
| 1,190,564 | 4/1965 | Germany | 324—175 |

RICHARD C. QUEISSER, Primary Examiner

E. J. KOCH, Assistant Examiner

U.S. Cl. X.R.

250—232